United States Patent [19]

Terashima et al.

[11] Patent Number: 4,892,393

[45] Date of Patent: Jan. 9, 1990

[54] FERROELECTRIC LIQUID CRYSTAL COMPOSITION

[75] Inventors: Kanetsugu Terashima; Mitsuyoshi Ichihashi, both of Ichiharashi; Makoto Kikuchi, Kisarazushi; Fusayuki Takeshita, Ichiharashi; Kenji Furukawa, Yokosukashi, all of Japan

[73] Assignee: Chisso Corporation, Osaka, Japan

[21] Appl. No.: 256,413

[22] Filed: Oct. 12, 1988

[30] Foreign Application Priority Data

Nov. 6, 1987 [JP] Japan .................................. 62-280625

[51] Int. Cl.$^4$ ........................ G02F 1/13; C09K 19/34
[52] U.S. Cl. ........................... 350/350 S; 252/299.01; 252/299.5; 252/299.61; 252/299.65; 252/299.66
[58] Field of Search ................... 252/299.61, 299.01, 252/299.5; 350/350 S

[56] References Cited

U.S. PATENT DOCUMENTS

| | | |
|---|---|---|
| 4,697,015 | 9/1987 | Kano et al. ................ 252/299.61 |
| 4,723,018 | 2/1988 | Shionozaki et al. ......... 252/299.61 |
| 4,725,688 | 2/1988 | Taguchi et al. ............ 252/299.61 |
| 4,753,752 | 6/1988 | Raynes et al. ............. 252/299.61 |
| 4,765,924 | 8/1988 | Inoue et al. .............. 252/299.61 |
| 4,775,223 | 10/1988 | Yoshinaga et al. ......... 252/299.01 |
| 4,780,242 | 10/1988 | Miyazawa et al. .......... 252/299.01 |
| 4,784,793 | 11/1988 | Coates et al. ............. 252/299.01 |
| 4,820,839 | 4/1989 | Krause et al. ............. 252/299.61 |
| 4,824,597 | 4/1989 | Kano ...................... 252/299.61 |
| 4,826,979 | 5/1989 | Kano ...................... 252/299.61 |
| 4,831,143 | 5/1989 | Shibata et al. ............ 252/299.61 |

FOREIGN PATENT DOCUMENTS

| | | |
|---|---|---|
| 255219 | 2/1988 | European Pat. Off. ....... 252/299.61 |
| 267758 | 5/1988 | European Pat. Off. ....... 252/299.61 |
| 269062 | 6/1988 | European Pat. Off. ....... 252/299.61 |
| 3515373 | 11/1986 | Fed. Rep. of Germany .... 252/299.61 |
| 61-271279 | 12/1986 | Japan ..................... 252/299.61 |
| 62-22889 | 1/1987 | Japan ..................... 252/299.61 |
| 63-48254 | 2/1988 | Japan ..................... 252/299.61 |
| 63-51377 | 3/1988 | Japan ..................... 252/299.61 |
| 63-137984 | 6/1988 | Japan ..................... 252/299.61 |
| 63-172788 | 7/1988 | Japan ..................... 252/299.61 |
| 2166754 | 5/1986 | United Kingdom .......... 252/299.01 |
| 8705012 | 8/1987 | World Int. Prop. O. ...... 252/299.61 |

OTHER PUBLICATIONS

Goodby, J. W. et al., J. de Physique, vol. 40, No. 4, Coll. C3 Suppl., pp. C3-27-35 (1979).

Primary Examiner—Teddy S. Gron
Attorney, Agent, or Firm—Fred Philpitt

[57] ABSTRACT

A ferroelectric liquid crystal composition exhibiting SC* phase within a broad temperature range including room temperature and also having high-speed response properties and a light switching element using the above-mentioned liquid crystal composition and exhibiting high-speed response properties are provided, which composition comprises at least one member of chiral compounds expressed by the formula

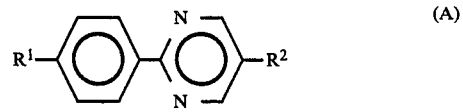

wherein $R^1$ and $R^2$ each represent a linear or branched chain alkyl, alkoxy, alkoxyalkoxy, alkoxycarbonyl, alkanoyl or alkanoyloxy group each of 1 to 18 C and at least one of $R^1$ and $R^2$ has an asymmetric carbon atom in the alkyl chain moiety of these groups, and at least one member of chiral compounds having a spontaneous polarization value of 40 nC/cm$^2$ or more.

3 Claims, No Drawings

FERROELECTRIC LIQUID CRYSTAL COMPOSITION

BACKGROUND OF THE INVENTION

1. Field of the Invention

This invention relates to a ferroelectric liquid crystal material. More particularly it relates to a ferroelectric liquid crystal composition comprising phenylpyrimidine chiral compound(s) and chiral compound(s) having a very large spontaneous polarization value and having high-speed response properties and a light switching element using the same.

2. Description of the Related Art

Liquid crystal compounds have been broadly used as materials for display elements, but most of such liquid crystal elements are those of TN display mode and as the liquid crystal materials, those belonging to nematic phase have been used.

Since TN display mode is non-emissive, it has specific features that eyes are not tired, the power consumption is very small, etc., but on the other hand, it has drawbacks that the response is slow, the visual sensation-dependency is inferior, etc. Thus, the above mode has recently been turned toward the direction of making the best use of its specific feature as a flat display, and in particular, high-speed response properties and the wideness of visual sensation have been required.

In order to meet such requirements, improvement in liquid crystal materials therefor has been attempted. However, as compared with other emissive displays (for example, electroluminescence display, plasma display, etc.), TN display mode is observed to still have a considerable difference from emissive display mode in the aspect of response time and wideness of visual sensation.

In order to make the best use of the specific features of liquid crystal display elements such as non-emissive mode, small power consumption, etc. and yet to secure response properties matching those of emissive display, it is indispensable to develop a novel liquid crystal display mode in place of TN display mode. As one of such attempts, a display mode utilizing the light switching phenomenon of ferroelectric liquid crystals has been proposed by N. A. Clark and S. T. Lagerwall (see Appl. Phys. Lett., Vol. 36, p. 899 (1980)).

As to ferroelectric liquid crystals, the presence thereof has been reported by R. B. Meyer et al for the first time (see J. Phys. Vol. 38, p. 69 (1975)), and the liquid crystals belong to chiral smectic C phase, chiral smectic I phase, chiral smectic F phase, chiral smectic G phase and chiral smectic H phase (hereinafter abbreviated to SC* phase, SI* phase, SF* phase, SG* phase and SH* phase, respectively).

Among these chiral smectic phases, SC* phase has now been particularly noted. As display modes utilizing the switching phenomenon of SC* phase, two modes may be considered. One of them is a birefringence mode using two polarizers and the other is a guest-host mode using a dichroic dyestuff.

As the specific features of these display modes, the following are exemplified:

(1) response time is very short;
(2) there are memory properties; and
(3) the visual sensation-dependency is small.

The display modes have a possibility of high density display and are very attractive as display elements.

A number of specific features have been required for ferroelectric liquid crystal materials used for ferroelectric liquid crystal elements practically employed, but at present there is no single compound satisfying all the requirements; thus it is necessary to use ferroelectric liquid crystal compositions obtained by mixing some liquid crystal compounds together or mixing nonliquid crystal compounds therewith.

Further, ferroelectric liquid crystal compositions are not only obtained only from ferroelectric liquid crystal compounds, but also when compounds or compositions exhibiting achiral smectic C, F, G, H, I phase or the like (hereinafter abbreviated to SC phase or the like) as base substances are mixed with at least one compound exhibiting ferroelectric liquid crystal phase, ferroelectric liquid crystal compositions are obtained as a whole (see Japanese patent application laid-open No. Sho 61-195187/1986).

Further, when compounds or compositions exhibiting SC phase or the like as base substances are mixed with at least one compound which is optically active but exhibits no ferroelectric liquid crystal phase, ferroelectric liquid crystal compositions are obtained as a whole (see Mol. Cryst. Liq. Cryst. 89, 327 (1982)).

In summary of these facts, it is seen that by mixing at least one optically active compound with base substances, it is possible to constitute ferroelectric liquid crystal compositions, irrespective of whether the optically active compound exhibits ferroelectric liquid crystal phase.

At present, a number of specific features have been required for ferroelectric liquid crystal materials, and the following have been particularly required:

(1) SC* phase is exhibited within a broad temperature range including room temperature (at least 0° C. to 50° C.); and
(2) The response time is 100 μsec or less.

At present, however, a ferroelectric liquid crystal material (liquid crystal composition) which satisfies all of such conditions has not yet been obtained.

For example, Japanese patent application laid-open No. Sho 61-291679/1986 and PCT International Patent Application laid-open No. WO86/06401 disclose a ferroelectric liquid crystal composition obtained by mixing an achiral compound, a 5-alkyl-2-(4-alkoxyphenyl)-pyrimidine with an optically active compound, which composition exhibits SC* phase within a broad temperature range including room temperature. Further, the former discloses that when a ferroelectric smectic liquid crystal material comprising the above pyrimidine derivative as a base Sm mixture is used, it is possible to shorten the response time of light switching elements.

Further, Japanese patent application laid-open No. Sho 61-291679/1986 discloses that a ferroelectric liquid crystal material consisting of a 5-alkyl-2-(4'-alkylbiphenylyl-4)pyrimidine, the above-mentioned 5-alkyl-2-(4- alkoxyphenyl)pyrimidine and an optically active compound also exhibits SC* phase within a broad temperature range including room temperature and is effective for improving the response properties.

However, as to the ferroelectric liquid crystal compositions disclosed in the above-mentioned Japanese patent application laid-open No. Sho 61-291679/1986 and PCT International patent application laid-open No. WO86/06401, they satisfy the requirement of the temperature range of SC* phase among the above-mentioned ones, but their response times are 300 to 500 μsec; hence they are still difficult to be regarded as practical.

Further, Japanese patent application laid-open Nos. Sho 60-260564/1985, Sho 61-22072/1986, Sho 61-93170/1986, etc. disclose that optically active phenylpyrimidine compounds exhibit SC* phase within a broad temperature range in the vicinity of room temperature and also have superior response properties, but for example, 5-n-octyl-2-[4-(6-methyloctyloxy)phenyl]-pyrimidine compound has a temperature range of SC* phase of 15° C.–49° C. and a response time of 600 μsec; hence it is practically impossible to use this compound alone for display.

Further, Japanese patent application laid-open No. Sho 61-129169/1986 discloses an example of composition using the above-mentioned optically active phenylpyrimidine compound, but for example, in Test example 1 thereof, the ferroelectric liquid crystal composition has a temperature range of SC* phase of 2° C. to 40° C. and also a response time of 180 μsec at 30° C.; thus this composition is also not practical.

As apparent from the foregoing, at present there has not yet been obtained a ferroelectric liquid crystal composition using an optically active phenylpyrimidine compound and exhibiting a broad temperature range including room temperature and also having high-speed response properties.

As described above, the response time of current ferroelectric liquid crystal materials is still late and hence not on a practical level so that further improvement in response properties has been earnestly desired.

SUMMARY OF THE INVENTION

As apparent from the foregoing, a first object of the present invention is to provide a ferroelectric liquid crystal composition exhibiting SC* phase within a broad temperature range including room temperature and also having high-speed response properties, and a second object thereof is to provide a light switching element using the above-mentioned liquid crystal composition and exhibiting high-speed response properties.

The present inventors have made extensive research in order to further improve the inventions disclosed in the above-mentioned Japanese patent application laid-open Nos. Sho 6-260564/1985, Sho 61-22072/1986, Sho 61-129169/1986, etc. As a result, we have found that when chiral compounds are combined together as described below, there is obtained a ferroelectric liquid crystal composition exhibiting SC* phase within a broad temperature range including room temperature and also having high-speed response properties, and have achieved the present invention.

The present invention in the first aspect resides in (1) a ferroelectric liquid crystal composition comprising at least one member of chiral compounds expressed by the formula

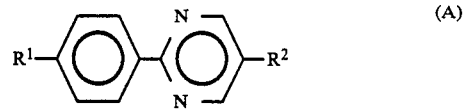

wherein $R^1$ and $R^2$ each represent a linear or branched chain alkyl group, alkoxy group, alkoxyalkoxy group, alkoxycarbonyl group, alkanoyl group or alkanoyloxy group each of 1 to 18 carbon atoms and at least one of $R^1$ and $R^2$ has an asymmetric carbon atom in the alkyl chain moiety of these groups, and at least one member of chiral compounds having a spontaneous polarization value of 40 nC/cm² or more.

and as the following embodiments (2), (3) and (4) of the above item (1);

(2) a ferroelectric liquid crystal composition according to item (1) wherein said at least one member of chiral compounds of the formula (A) is at least one member selected from the group consisting of compounds of the following formulas:

(A-I), (A-II), (A-III), (A-IV), (A-V) and (A-VI):

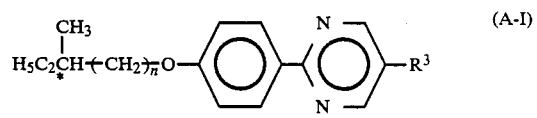

wherein $R^3$ represents a linear or branched chain alkyl or alkoxy group each of 1 to 18 carbon atoms; n represents an integer of 0 to 8; and * indicates an asymmetric carbon;

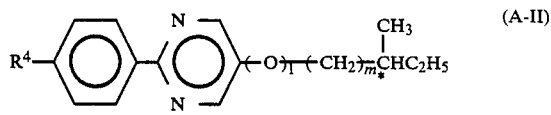

wherein $R^4$ represents a linear or branched chain alkyl or alkoxy group each of 1 to 18 carbon atoms; m represents an integer of 0 to 8; l represents 0 or 1; and * indicates an asymmetric carbon atom;

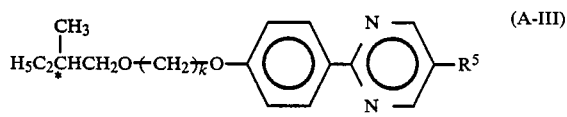

wherein $R^5$ represents a linear or branched chain alkyl or alkoxy group each of 1 to 18 carbon atoms; k represents an integer of 1 to 8 carbon atoms; and * indicates an asymmetric carbon atom;

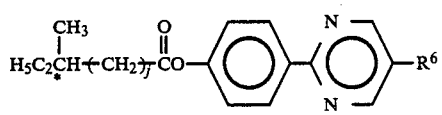

(A-IV)

wherein $R^6$ represents a linear or branched chain alkyl or alkoxy group each of 1 to 18 carbon atoms; j represents an integer of 0 to 8; and * indicates an asymmetric carbon atom;

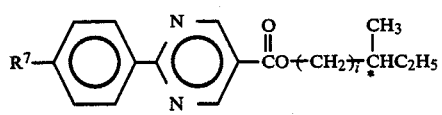

(A-V)

wherein $R^7$ represents a linear or branched chain alkyl or alkoxy group each of 1 to 18 carbon atoms; i represents an integer of 0 to 8 carbon atoms; and * indicates an asymmetric carbon atom; and

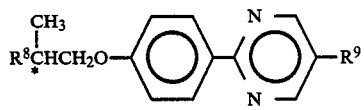

(A-VI)

wherein $R^8$ represents a linear or branched chain alkyl or alkoxy group each of 2 to 8 carbon atoms; $R^9$ represents a linear or branched chain alkyl or alkoxy group each of 1 to 18 carbon atoms; and * indicates an asymmetric carbon atom;

(3) a ferroelectric liquid crystal composition according to item (1) wherein said at least one of chiral compounds having a spontaneous polarization value of 40 nC/cm² or more is at least one member selected from the group consisting of compounds of the following formulas (VII), (VIII), (IX), (X), (XI), (XII), (XIII), (XIV) and (XV):

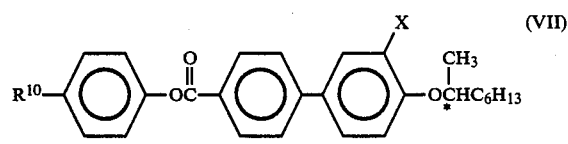

(VII)

wherein $R^{10}$ represents a linear or branched chain alkyl or alkoxy group each of 1 to 18 carbon atoms; X represents —H, —F or —CN; and * represents an asymmetric carbon atom;

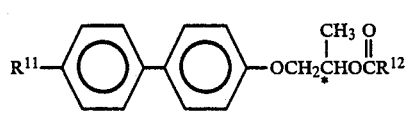

(VIII)

wherein $R^{11}$ and $R^{12}$ each represent a linear or branched chain alkyl or alkoxy group each of 1 to 18 carbon atoms; and * indicates an asymmetric carbon atom;

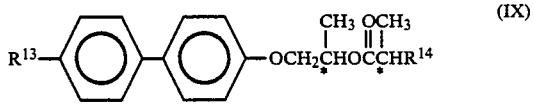

(IX)

wherein $R^{13}$ represents a linear or branched chain alkyl or alkoxy group each of 1 to 18 carbon atoms; $R^{14}$ represents a linear or branched alkyl group of 2 to 18 carbon atoms or a linear or branched alkoxy group of 1 to 18 carbon atoms; and * indicates an asymmetric carbon atom;

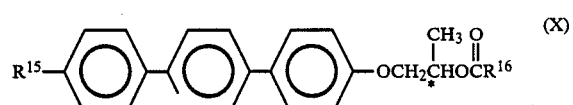

(X)

wherein $R^{15}$ and $R^{16}$ each represent a linear or branched chain alkyl or alkoxy group each of 1 to 18 carbon atoms; and * represents an asymmetric carbon atom;

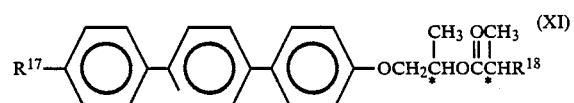

(XI)

wherein $R^{17}$ represents a linear or branched chain alkyl or alkoxy group each of 1 to 18 carbon atoms; $R^{18}$ represents a linear or branched chain alkyl group of 2 to 18 carbon atoms or a linear or branched alkoxy group of 1 to 18 carbon atoms; and * indicates an asymmetric carbon atom;

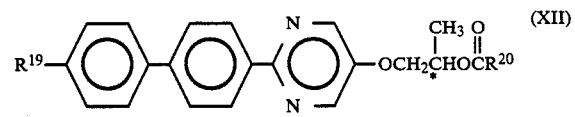

(XII)

wherein $R^{19}$ and $R^{20}$ each represent a linear or branched chain alkyl or alkoxy group each of 1 to 18 carbon atoms; and * indicates an asymmetric carbon atom;

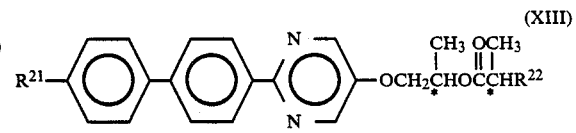

(XIII)

wherein $R^{21}$ represents a linear or branched chain alkyl or alkoxy group of 1 to 18 carbon atoms; $R^{22}$ represents a linear or branched chain alkyl group of 2 to 18 carbon atoms or a linear or branched chain alkoxy group of 1 to 18 carbon atoms; and * represents an asymmetric carbon atom;

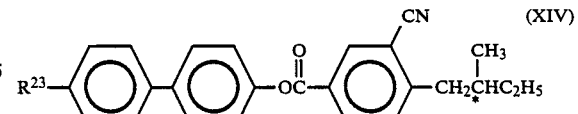

(XIV)

wherein $R^{23}$ represents a linear or branched chain alkyl or alkoxy group each of 1 to 18 carbon atoms; and * indicates an asymmetric carbon atom; and

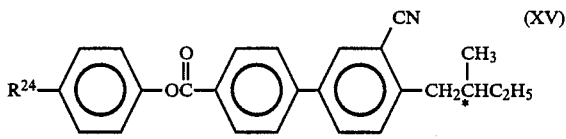

(XV)

wherein $R^{24}$ represents a linear or branched chain alkyl or alkoxy group each of 1 to 18 carbon atoms; and * indicates an asymmetric carbon atom; and (4) a ferroelectric liquid crystal composition according to item (1), wherein the concentration of said chiral compound expressed by the formula (A) is in the range of 20 to 80% by weight and the concentration of said chiral compound having a spontaneous polarization value of 40 $nC/cm^2$ or more is in the range of 5 to 50% by weight, the respective compositions being based on the weight of said composition.

(5) The present invention in the second aspect resides in a light switching element using a ferroelectric liquid crystal composition comprising as its effective ingredients, at least one member of chiral compounds expressed by the formula

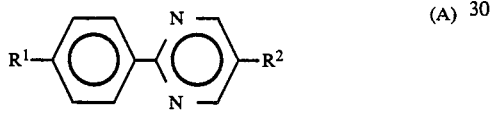

(A)

wherein $R^1$ and $R^2$ each represent a linear or branched chain alkyl group, alkoxy group, alkoxyalkoxy group, alkoxycarbonyl group, alkanoyl group or alkanoyloxy group each of 1 to 18 carbon atoms and at least one of $R^1$ and $R^2$ has an asymmetric carbon atom in the alkyl chain moiety of these groups, and at least one member of chiral compounds having a spontaneous polarization value of 40 $nC/cm^2$ or more.

DETAILED DESCRIPTION OF THE INVENTION

Concrete examples of the phenylpyrimidine compounds expressed by the formula

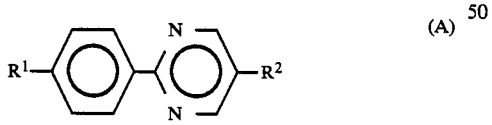

(A)

wherein $R^1$ and $R^2$ each represent a linear or branched chain alkyl group, alkoxy group, alkoxyalkoxy group, alkoxycarbonyl group, alkanoyl group or alkanoyloxy group each of 1 to 18 carbon atoms and at least one of $R^1$ and $R^2$ has an asymmetric carbon atom in the alkyl chain moiety of these groups, and used in the present invention, are known compounds expressed by the above formulas (A-I) to (A-VI) (e.g. see Japanese patent application laid-open Nos. Sho 60-260564/1985, Sho 61-22072/1986, Sho 61-93170/1986, Sho 61-200973/1986, Sho 61-215372/1986, Sho 61-129170/1986, etc.). Compounds of such formulas are characterized in that they have not so large spontaneous polarization values, but low viscosities and a tendency of exhibiting SC* phase in the vicinity of room temperature; hence they are useful compounds as base liquid crystals and by combining a plurality thereof, it is possible to form base SC* mixtures.

In the ferroelectric liquid crystal composition aimed in the present invention, it is preferred to use compounds expressed by the above formulas (A-I) to (A-VI), but even in the case of compounds not expressed by the formulas (A-I) to (A-VI), if such compounds are optically active compounds having a phenylpyrimidine core expressed by the formula (A), it is possible to use the compounds as a component of the liquid crystal composition of the present invention, within a range of quantity in which the specific features of the liquid crystal composition of the present invention are not damaged.

Representative examples of compounds expressed by the formula (A) and having SC* phase are as follows:

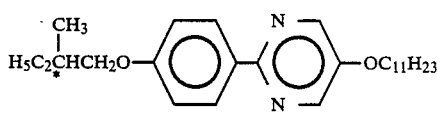

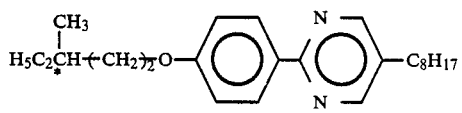

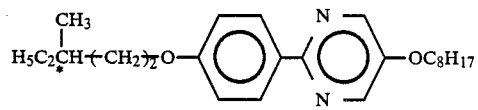

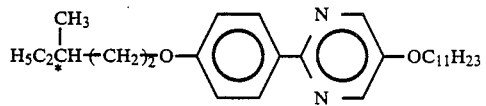

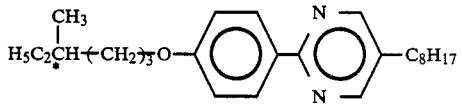

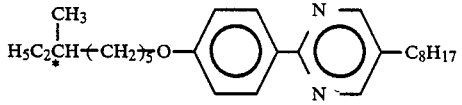

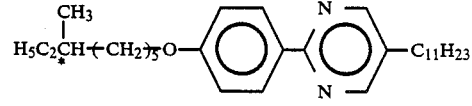

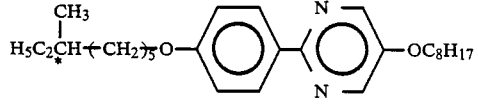

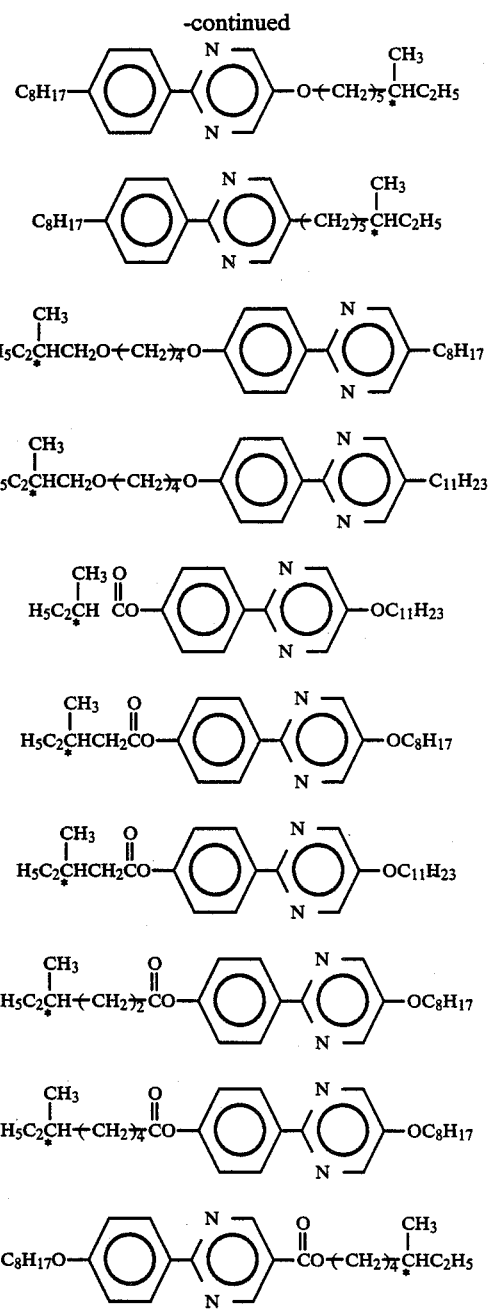

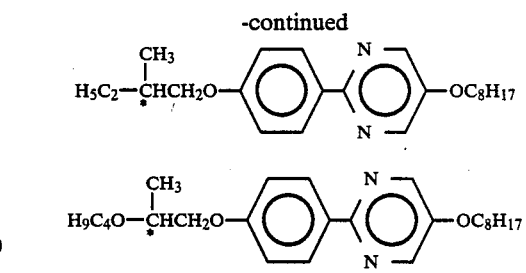

As the optically active phenylpyrimidine compounds expressed by the formula (A) and used as a component of the ferroelectric liquid crystal composition aimed in the present invention, the above-mentioned compounds having SC* phase are preferred, but even in the case of compounds exhibiting no SC* phase, it is possible to use the compounds in a limited quantity within a range in which the SC* phase temperature range of the resulting base SC* mixture is not notably narrowed.

On the other hand, concrete examples of the compounds having a spontaneous polarization value of 40 nC/cm² or more and used in the present invention are compounds expressed by the above formulas (VII) to (XV) which compounds have been previously applied for patent by the present inventors and already laid-open (see e.g. Japanese patent application laid-open No. Sho 60-43/1985, etc.) or previously applied for patent by the present inventors but not yet laid open (e.g. Japanese patent application Nos. Sho 61-133269/1986, Sho 62-049796/1987, Sho 62-103977/1987, Sho 62-67097/1987, Sho 61-192516/1986, etc.). Since a specific feature of these compounds consists in a very large spontaneous polarization value 40 nC/cm²–300 nC/cm²), the compounds play an important role of exhibiting high-speed response properties in the ferroelectric liquid crystal composition aimed in the present invention.

In the ferroelectric liquid crystal composition aimed in the present invention, compounds expressed by the formulas (VII) to (XV) are preferred, but even in the case of compounds other than the above, if the compounds have a spontaneous polarization value of 40 nC/cm² or more, it is possible to use the compounds as a component of the ferroelectric liquid crystal composition aimed in the present invention, within a range of quantity in which the specific features of the composition are not damaged. Representative examples of the compounds having a spontaneous polarization value of 40 nC/cm² or more are as follows:

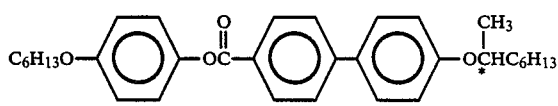

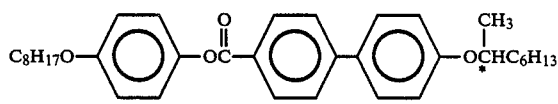

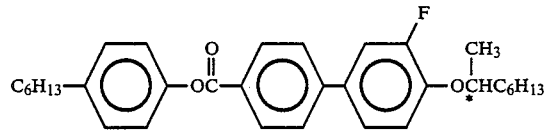
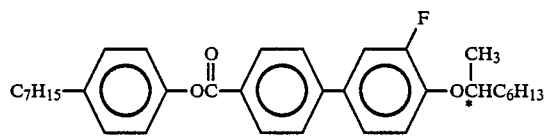
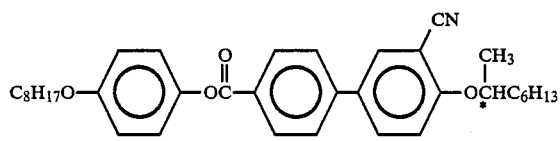
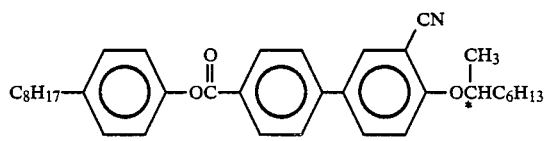
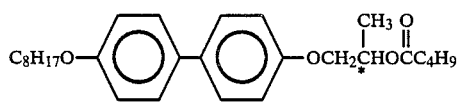
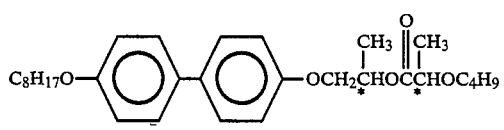
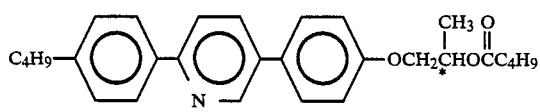
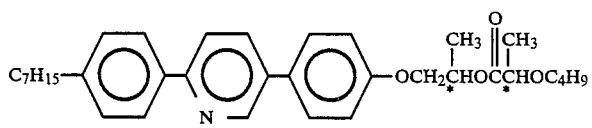
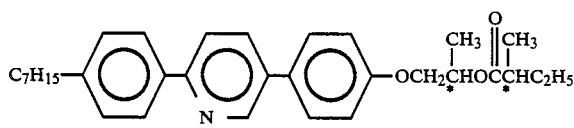
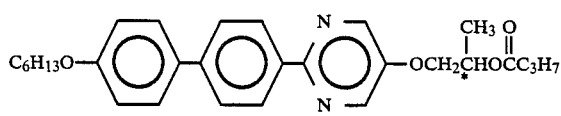
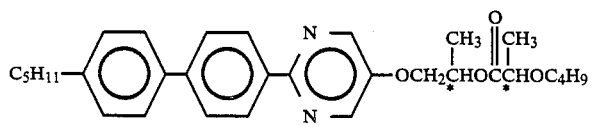
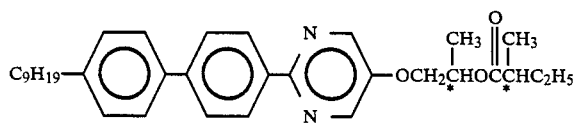

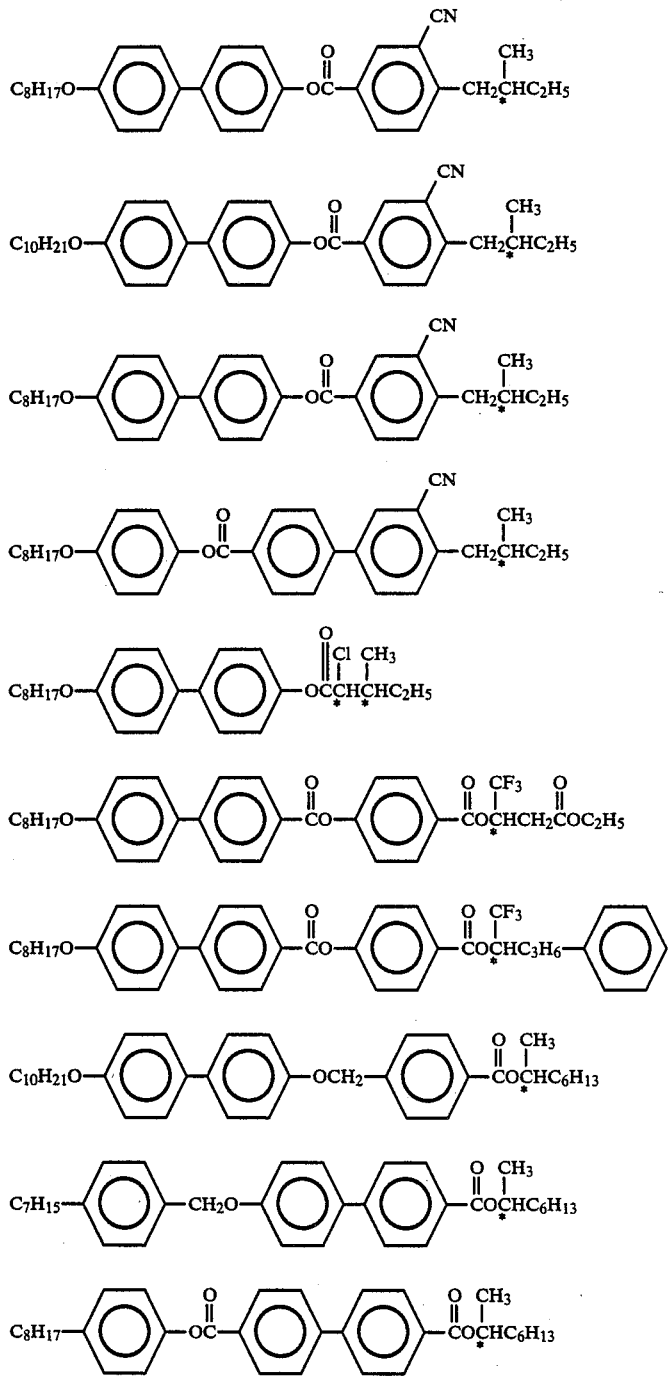

The compound having a spontaneous polarization value of 40 nC/cm² or more and used as a component of the ferroelectric liquid crystal composition aimed in the present invention is preferred to be those having SC* phase, but even in the case of compounds exhibiting no SC* phase, it is possible to use the compounds in a limited quantity within a range in which the SC* phase temperature range of the ferroelectric liquid crystal composition aimed in the present invention is not notably narrowed.

As described above, the ferroelectric liquid crystal composition of the present invention is achieved by combining optically active phenylpyrimidine compound(s) expressed by the formula (A) with chiral compound(s) having a spontaneous polarization value of 40 nC/cm² or more, but other chiral compounds as shown below, for adjusting the helical pitch may be used within a range of quantity in which the object of the present invention is not damaged:

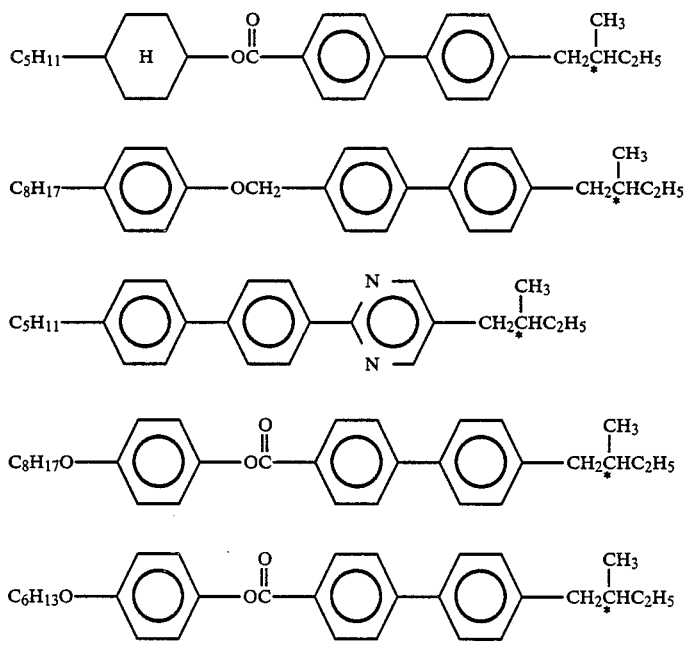

The present invention is based upon a finding that when optically active phenylpyrimidine compound(s) expressed by the formula (A) are combined with chiral compound(s) having a very large spontaneous polarization value, superior specific features are exhibited.

The phenylpyrimidine chiral compounds expressed by the formulas (A-I) to (A-VI) have a not so large spontaneous polarization value (1 nC/cm$^2$ to 5 nC/cm$^2$), but exhibit SC* phase in the vicinity of room temperature and also have a low viscosity; hence the compounds play a role of a base SC* compound in the ferroelectric liquid crystal composition aimed in the present invention and constitute a motive force by which SC* phase is exhibited within a broad temperature range including room temperature. Representative compounds and their phase transition points are shown in Table 1.

TABLE 1

| Compound | Phase transition points (°C.) |
|---|---|
| A | $C_r \xrightarrow{3} S_B \xrightarrow{14} S_{C^*} \xrightarrow{49} S_A \xrightarrow{56} I_{SO}$ |
| B | $C_r \xrightarrow{36} S_{C^*} \xrightarrow{60} I_{SO}$ |
| C | $C_r \xrightarrow{31} S_{C^*} \xrightarrow{47} S_A \xrightarrow{51} I_{SO}$ ; $\searrow^{17} S_B$ |
| D | $C_r \xrightarrow{41} S_{C^*} \xrightarrow{83} S_A \xrightarrow{89} I_{SO}$ |
| E | $C_r \xrightarrow{49} S_{C^*} \xrightarrow{78} I_{SO}$ |

TABLE 1-continued

| Compound | Phase transition points (°C.) |
|---|---|
| F: H₅C₂CH(CH₃O)*-CO-⟨phenyl⟩-⟨pyrimidine⟩-OC₈H₁₇ | Cr —66→ Iso ↙62 Sc* |
| G: H₅C₂CH(CH₃)*CH₂O(CH₂)₄O-⟨phenyl⟩-⟨pyrimidine⟩-C₈H₁₇ | Cr —−1→ Sc* —42→ Iso |
| H: H₅C₂CH(CH₃)*CH₂O(CH₂)₄O-⟨phenyl⟩-⟨pyrimidine⟩-C₁₁H₂₃ | Cr —16→ Sc* —52→ Iso |
| I: C₈H₁₇-⟨phenyl⟩-⟨pyrimidine⟩-O(CH₂)₅CH(CH₃)*CH₂C₂H₅ | Cr —−13→ S₄ —10→ S₃ —18→ Sc* —51→ S_A —52→ Iso |

Note:
At present, what kind of smectic phases S₃ and S₄ belong to could have not yet been identified.

As apparent from Table 1, compounds A, G, H and I have very low melting temperatures, whereas compounds B, C, D, E and F have high upper limit temperatures of SC* phase; hence when these compounds A to I are combined, base SC* compositions exhibiting SC* phase within a broad temperature range including room temperature are obtained.

Using compounds, A, D, E, F and I in Table 1, the following base SC* composition A was prepared:

Composition A

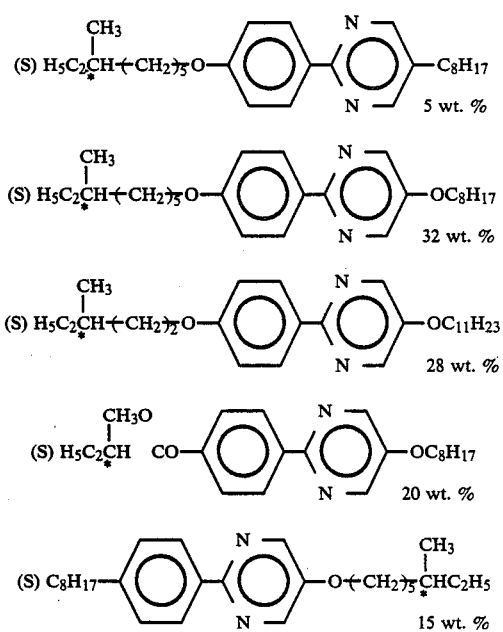

(S) H₅C₂CH*(CH₂)₅O-⟨phenyl⟩-⟨pyrimidine⟩-C₈H₁₇   5 wt. %

(S) H₅C₂CH*(CH₂)₅O-⟨phenyl⟩-⟨pyrimidine⟩-OC₈H₁₇   32 wt. %

(S) H₅C₂CH*(CH₂)₂O-⟨phenyl⟩-⟨pyrimidine⟩-OC₁₁H₂₃   28 wt. %

(S) H₅C₂CH(CH₃O)*-CO-⟨phenyl⟩-⟨pyrimidine⟩-OC₈H₁₇   20 wt. %

(S) C₈H₁₇-⟨phenyl⟩-⟨pyrimidine⟩-O(CH₂)₅CH*(CH₃)CH₂C₂H₅   15 wt. %

The phase transition points of this composition were as follows:

$$Cr \xrightarrow{-5°C.} Sc* \xrightarrow{70°C.} S_A \xrightarrow{75°C.} I_{so}$$

As seen from the foregoing, when compounds expressed by the formulas (A-I) to (A-VI) are combined, base SC* compositions exhibiting SC* phase within a broad temperature range including the vicinity of room temperature are obtained.

Further, the response time of the above composition A was 350 μsec at an electric field intensity of 5 V/μm and 25° C.

The SC* phase temperature range is practical, but the response time is still late; hence even taking the prior art into account, it is regarded impossible to obtain a practical ferroelectric liquid crystal composition only from phenylpyrimidine compounds expressed by the formula (A).

Using this base SC* composition A and a chiral compound J expressed by the formula (VII) and having a very large spontaneous polarization value (150 nC/cm² (T-Tc=30° C.)), the following ferroelectric liquid crystal composition B was prepared:

Composition B

Composition A (base SC* composition) 80 wt. % and (S) C₆H₁₃-⟨phenyl⟩-OC(=O)-⟨phenyl⟩-⟨phenyl-F⟩-OCH*(CH₃)C₆H₁₃

(compound J)
20 wt. %.

The phase transition points of this composition were as follows:

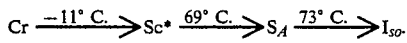

Further, its response time was 80 μsec at 25° C., its spontaneous polarization value was 30 nC/cm² and its tilt angle was 22°.

Further, using the following known achiral phenylpyrimidine compounds, the following base SC composition C was prepared:

Composition C

| C₆H₁₃O—⟨phenyl⟩—⟨pyrimidine(N,N)⟩—C₈H₁₇ | 30 wt. % |
| C₈H₁₇O—⟨phenyl⟩—⟨pyrimidine(N,N)⟩—C₈H₁₇ | 20 wt. % |
| C₉H₁₉O—⟨phenyl⟩—⟨pyrimidine(N,N)⟩—C₈H₁₇ | 10 wt. % |
| C₁₀H₂₁O—⟨phenyl⟩—⟨pyrimidine(N,N)⟩—C₈H₁₇ | 10 wt. % |
| C₅H₁₁O—⟨phenyl⟩—⟨phenyl⟩—⟨pyrimidine(N,N)⟩—C₈H₁₇ | 20 wt. % |
| C₇H₁₅O—⟨phenyl⟩—⟨phenyl⟩—⟨pyrimidine(N,N)⟩—C₈H₁₇ | 10 wt. % |

The phase transition points of this composition C was as follows:

Using this base SC composition C and the above-mentioned chiral compound J, the following ferroelectric liquid crystal composition D was prepared:

Composition D

| Composition C (base SC composition) | 80 wt. % and |
| Compound J | 20 wt. %. |

The phase transition points of this composition were as follows:

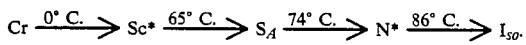

Further, its response time was 195 μsec at 25° C., its spontaneous polarization value was 5 nC/cm² and its tilt angle was 23 °.

As seen from comparison of the composition B with composition D, the ferroelectric liquid crystal composition consisting of phenylpyrimidine chiral compounds expressed by the formula (A) and used in the present invention has a broader SC* phase temperature range than that of the ferroelectric liquid crystal composition consisting of achiral phenylpyrimidine compounds, and also has superior response properties to those of the latter. In other words, it has been found by the present inventors for the first time that optically active phenylpyrimidine compounds are superior in the specific features as the base liquid crystals to phenylpyrimidine compounds which have most excellent specific features among achiral SC compounds (see e.g. Japanese patent application laid-open No. Sho 61-291679/1986) (the specific features consisting in a broad SC* phase temperature range and an effect of making the response properties faster).

In general, among the spontaneous polarization value (abbreviated to Ps), the viscosity (abbreviated to η) and the response time (abbreviated to τ) of ferroelectric liquid crystal materials, there is the following relationship:

$$\tau = \frac{\eta}{Ps \cdot E}$$

wherein E refers to the intensity of an electric field impressed to a liquid crystal cell, and a compound having a low viscosity and also a large spontaneous polarization value is desired.

Using the above equation, the viscosities of the above mentioned ferroelectric liquid crystal compositions B and D were calculated. As a result, the viscosity of the composition B was 1.2 poise and that of the composition D was 0.5 poise. Since the kinds and concentrations of these chiral compounds are both the same, the difference between the above viscosities may be considered to correspond to the difference between the base liquid crystals.

With regard to the viscosity, viscosities of achiral phenylpyrimidine compounds are considerably lower than those of chiral phenylpyrimidine compounds, but chiral phenylpyrimidine compounds have an effect of greatly increasing the spontaneous polarization value and this effect apparently offsets the drawback of the higher viscosity thereof. Thus, in a summary view, chiral phenylpyrimidine compounds may be said to be superior as base liquid crystals to achiral phenylpyrimidine compounds.

The optically active phenylpyrimidine compounds expressed by the formula (A) play a role as base SC* compounds; hence the concentration range of the chiral compounds expressed by the formula (A) is preferred to be 80% by weight or less.

Further, the viscosity of the ferroelectric liquid crystal compositions is affected not only by the base liquid crystal compounds, but also by the chiralizing agents having a large spontaneous polarization value. In general, the viscosities of compounds having an ester bond at the center thereof as in the case of the above-mentioned compound J are higher than the viscosities of compounds of directly bonded rings type expressed by the above formulas (VIII) to (XIII). Thus, now if the average value of viscosities of ferroelectric liquid crystal compositions is presumed to be in the range of 0.8 to 1.0 poise, then a spontaneous polarization value of at least 16 to 20 nC/cm$^2$ is required for obtaining a response time of 100 μsec in the case of an electric field intensity of 5V/μm.

The spontaneous polarization values of the optically active phenylpyrimidine compounds expressed by the formula (A) are not so large (1 to 5 nC/cm$^2$), and in order to form base SC* compositions, a compound having a small spontaneous polarization value but having a broad SC* phase temperature region (such as compounds expressed by the formulas (A-I) to (A-III)) should be used; thus the spontaneous polarization value of the base SC* composition of the present invention is nearly 0 nC/cm$^2$.

Further, the concentration of the compound having a large spontaneous polarization value used is preferred to be 50% by weight or less, taking into consideration the SC* phase temperature range, helical pitch length, tilt angle, etc. Thus, in order to make the response time of the ferroelectric liquid crystal composition 100 μsec or less (i.e. in order to make the spontaneous polarization value 16 nC/cm$^2$ or more), a chiral compound having a spontaneous polarization value of at least 32 nC/cm$^2$ in 50% by weight or less is required.

In the case of a chiral compound having a largest spontaneous polarization value, the concentration range of the chiral compound used may be 50% by weight or less. Thus, as the chiral compound having a large spontaneous polarization value in the ferroelectric liquid crystal composition aimed in the present invention, a compound having a spontaneous polarization value of 40 nC/cm$^2$ or more can be said to be useful, taking the concentration thereof used into consideration.

As apparent from the foregoing, a chiral compound having a spontaneous polarization value of 40 nC/cm$^2$ or more plays an important role for exhibiting high-speed response properties in the ferroelectric liquid crystal composition aimed in the present invention.

Representative examples of the compound having a large spontaneous polarization value and their spontaneous polarization values are shown in Table 2.

TABLE 2

| Compound | Structure | Spontan.polariz. value (nC/cm$^2$)[1] |
|---|---|---|
| K | $C_6H_{13}O$—⬡—$OC(=O)$—⬡—⬡—$OCH(CH_3)C_6H_{13}$* | 110 |
| L | $C_6H_{13}$—⬡—$OC(=O)$—⬡—⬡(F)—$OCH(CH_3)C_6H_{13}$* | 163 |
| M | $C_8H_{17}O$—⬡—$OC(=O)$—⬡—⬡(CN)—$OCH(CH_3)C_6H_{13}$* | 240 |
| N | $C_8H_{17}O$—⬡—⬡—$OCH_2CH(CH_3)OC(=O)C_4H_9$* | 75[2] |
| O | $C_8H_{17}O$—⬡—⬡—$OCH_2CH(CH_3)OC(=O)CH(OCH_3)C_4H_9$** | 125[2] |
| P | $C_7H_{15}$—⬡—⬡(N)—⬡—$OCH_2CH(CH_3)OC(=O)CH(OCH_3)C_4H_9$** | 425 |
| Q | $C_6H_{13}O$—⬡—⬡—⬡(N,N)—$OCH_2CH(CH_3)OC(=O)CH(OCH_3)C_6H_{13}$** | 327[3] |

TABLE 2-continued

| Compound | Spontan.polariz. value (nC/cm²)[1] |
|---|---|
| R: $C_{10}H_{21}O$—⟨⟩—⟨⟩—O—C(=O)—⟨⟩(CN)—$CH_2\overset{*}{C}H(CH_3)C_2H_5$ | 40 |

[1] T-Tc = value at −30° C.
[2] Extrapolated value from a mixture thereof with composition C, since these compounds exhibit no SC* phase.
[3] T-Tc = value at −10° C.

The present invention will be described in more detail by way of Examples, but it should not be construed to be limited thereto.

Further, the spontaneous polarization value (Ps) was measured according to Sawyer-Tower method and the helical pitch (P) was sought by using a cell of 200 μm thick subjected to homogeneous alignment and directly measuring the distances between dechiralization lines corresponding to the helical pitch under a polarizing microscope. The tilt angle (θ) was sought by impressing an electric field sufficiently higher than the critical electric field to a cell subjected to homogeneous alignment to thereby extinguish the helical structure, followed by inverting the polarity and measuring the resulting moved angle (corresponding to 2θ) at extinction site under crossed nicols.

The response time was sought by filling the respective compositions in a cell provided with electrodes and having a distance between the electrodes of 2 μm, followed by impressing a square wave of a $V_{pp}$ (impressed voltage (peak to peak)) of 20 V and 100 Hz and measuring change in the intensity of transmitted light.

In addition, Examples include a composition containing a chiral compound for elongating the helical pitch of SC* phase besides a chiral compound expressed by the formula (A) and a chiral compound having a large spontaneous polarization value, but to contain such a chiral substance does not damage the specific features of the ferroelectric liquid crystal composition aimed in the present invention and hence raises no problem.

EXAMPLES 1 TO 5

The respective proportions of Examples 1 to 5 of the ferroelectric liquid crystal compositions of the present invention are shown in Table 3 and the characteristic values of the compositions are shown in Table 4. In addition, the respective proportions in Table 3 refer to % by weight.

TABLE 3

| For- mula | Compound | Example No. 1 | 2 | 3 | 4 | 5 |
|---|---|---|---|---|---|---|
| A-I | (S) $H_5C_2\overset{*}{C}H(CH_3)\text{-}(CH_2)_5\text{-}O$—⟨⟩—⟨N=N⟩—$C_8H_{17}$ | 4 | 3 | 10 | 10 | 10 |
| A-I | (S) $H_5C_2\overset{*}{C}H(CH_3)\text{-}(CH_2)_5\text{-}O$—⟨⟩—⟨N=N⟩—$OC_8H_{17}$ | 22 | 20 | 15 | 15 | 15 |
| A-I | (S) $H_5C_2\overset{*}{C}H(CH_3)\text{-}(CH_2)_3\text{-}O$—⟨⟩—⟨N=N⟩—$C_{11}H_{23}$ | 14 | | | 10 | |
| A-I | (S) $H_5C_2\overset{*}{C}H(CH_3)\text{-}(CH_2)_2\text{-}O$—⟨⟩—⟨N=N⟩—$OC_{11}H_{23}$ | 20 | 15 | 10 | 10 | |
| A-II | (S) $C_8H_{17}$—⟨⟩—⟨N=N⟩—$O\text{-}(CH_2)_5\text{-}\overset{*}{C}H(CH_3)C_2H_5$ | 10 | 10 | 10 | 10 | |
| A-III | (S) $H_5C_2\overset{*}{C}HO\text{-}(CH_2)_4\text{-}O$—⟨⟩—⟨N=N⟩—$C_8H_{17}$ (with $CH_3$) | | | | | 10 |

TABLE 3-continued

| Formula | Compound | Example No. 1 | 2 | 3 | 4 | 5 |
|---|---|---|---|---|---|---|
| A-III | (S) H$_5$C$_2$CH(CH$_3$)O(CH$_2$)$_4$O—[Ph]—[pyrimidine]—C$_{11}$H$_{23}$ | | 12 | | | |
| VII | (S) C$_6$H$_{13}$—[Ph]—OC(O)—[Ph]—[Ph(F)]—OCH(CH$_3$)C$_6$H$_{13}$ | 10 | 10 | | 20 | 20 |
| VII | (S) C$_7$H$_{15}$—[Ph]—OC(O)—[Ph]—[Ph(F)]—OCH(CH$_3$)C$_6$H$_{13}$ | | 5 | | | |
| VII | (S) C$_7$H$_{15}$—[Ph]—OC(O)—[Ph]—[Ph]—OCH(CH$_3$)C$_6$H$_{13}$ | | 5 | | | |
| VII | (S) C$_7$H$_{15}$O—[Ph]—OC(O)—[Ph]—[Ph(CN)]—OCH(CH$_3$)C$_6$H$_{13}$ | | | | 20 | |
| VIII | (S) C$_8$H$_{17}$O—[Ph]—[Ph]—OCH$_2$CH(CH$_3$)OC(O)C$_4$H$_9$ | 10 | 10 | | | |
| IX | (S,S) C$_8$H$_{17}$O—[Ph]—[Ph]—OCH$_2$CH(CH$_3$)OC(O)CH(OCH$_3$)C$_4$H$_9$ | | 5 | | | |
| XI | (S,S) C$_7$H$_{15}$—[Ph]—[pyridine]—[Ph]—OCH$_2$CH(CH$_3$)OC(O)CH(OCH$_3$)C$_4$H$_9$ | | | | 10 | 20 |
| XI | (S,S) C$_7$H$_{15}$—[Ph]—[pyridine]—[Ph]—OCH$_2$CH(CH$_3$)OC(O)CH(OCH$_3$)CH$_2$C$_2$H$_5$ | | | | 10 | |
| XIII | (S,S) C$_5$H$_{11}$—[Ph]—[Ph]—[pyrimidine]—OCH$_2$CH(CH$_3$)OC(O)CH(OCH$_3$)C$_4$H$_9$ | | | | 10 | |
| XIV | (S) C$_8$H$_{17}$O—[Ph]—[Ph]—OC(O)—[Ph(CN)]—CH$_2$CH(CH$_3$)C$_2$H$_5$ | | | 10 | 10 | |
| XV | (S) C$_8$H$_{17}$O—[Ph]—OC(O)—[Ph]—[Ph(CN)]—CH$_2$CH(CH$_3$)C$_2$H$_5$ | | | | | 10 |

TABLE 3-continued

| Formula Compound | Example No. 1 | 2 | 3 | 4 | 5 |
|---|---|---|---|---|---|
| Others | | | | | |

(S) C$_5$H$_11$—[cyclohexyl]—OC(O)—[phenyl]—[phenyl]—CH$_2$C*H(CH$_3$)C$_2$H$_5$     5   5

(S) C$_8$H$_{17}$—[phenyl]—OCH$_2$—[phenyl]—[phenyl]—CH$_2$C*H(CH$_3$)C$_2$H$_5$        10

(S) C$_5$H$_{11}$—[phenyl]—[phenyl]—[pyrimidinyl N=N]—CH$_2$C*H(CH$_3$)C$_2$H$_5$    5   5

(S,S) C$_4$H$_9$—[phenyl]—[phenyl]—[pyridyl N]—OCH$_2$C*H(CH$_3$)OC(O)C*H(OCH$_3$)C$_2$H$_5$        10

TABLE 4

| | Characteristics | | | | | | | |
|---|---|---|---|---|---|---|---|---|
| | Phase transition points (°C.) | | | | Spontan.* polar. value | Helical* pitch | Tilt* angle | Response* time |
| Example No. | Gr | Sc* | SA | N* | Iso | (nC/cm$^2$) | (μm) | (°) | (μ sec) |
| 1 | • −21 | = 55 • 67 | • | | • | 35 | 2 | 26 | 80 |
| 2 | • −15 | • 53 • 70 | | • 74 | • | 43 | 10 | 24 | 65 |
| 3 | • unknown** | • 63 • 85 | | • 90 | • | 68 | 8 | 27 | 48 |
| 4 | • unknown** | • 74 | | • 88 | • | 75 | 4 | 36 | 80 |
| 5 | • unknown** | • 71 • 82 | | • 85 | • | 82 | 7 | 35 | 75 |

*Value at 25° C.
**Cooled down to −50° C., but no crystallization was observed; m.p., unknown.

EXAMPLE 6

The ferroelectric liquid crystal composition prepared in Example 3 was filled in a cell provided with transparent electrodes each having PVA as an aligning agent coated to subject the surface to parallel aligning treatment and having a cell gap of 2 kμm, followed by placing the resulting liquid crystal cell between two polarizers arranged at crossed nicol state and impressing a low frequency alternating current of 0.5 Hz and 20 V. As a result, a clear switching operation having a very good contrast (1:20) was observed and a liquid crystal display element having a response time as very fast as 25 μsec at 25° C. was obtained.

EXAMPLE 7

To the ferroelectric liquid crystal composition prepared in Example 5 was added an anthraquinone dyestuff D-16 (tradename of product made by BDH Company) expressed by the formula

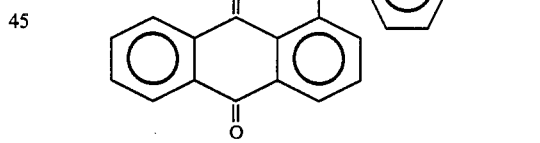

in 3% by weight to prepare a guest-host mode composition. The composition was filled in a cell treated in the same manner as in Example 6 and having a cell gap of 8 μm, followed by arranging a polarizer so that the polarization surface could be parallel to molecular axis and impressing a low frequency alternating current of 0.5 Hz and 40 V. As a result, a clear switching operation having a very good contrast (1:10) was observed, and a color liquid crystal display element having a response time as very fast as 80 μsec at 25° C. was obtained.

What we claim is:

1. A ferroelectric liquid crystal composition comprising at least one member selected from the group consisting of chiral compounds expressed by the following formulas (A-I) to (A-VI) and at least one member selected from the group consisting of compounds expressed by the following formulas (VII) to (XV) and having a spontaneous polarization value of 40 nC/cm² or more, the concentration of said at least one member of chiral compounds of the formulas (A-I) to (A-VI) used being 20 to 80% by weight and the concentration of said at least one member of compounds of the formulas (VII) to (XV) used being 5 to 50% by weight:

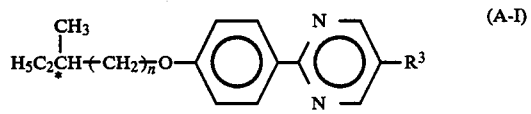
(A-I)

wherein $R^3$ represents a linear or branched chain alkyl or alkoxy group each of 1 to 18 carbon atoms; n represents an integer of 2 to 5; and * indicates an asymmetric carbon:

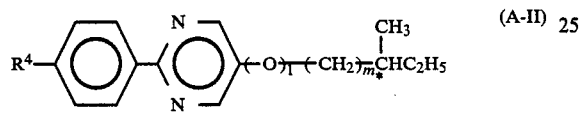
(A-II)

wherein $R^4$ represents a linear or branched chain alkyl or alkoxy group each of 1 to 18 carbon atoms; m represents an integer of 2 to 5; l represents 0 or 1; and * indicates an asymmetric carbon atom;

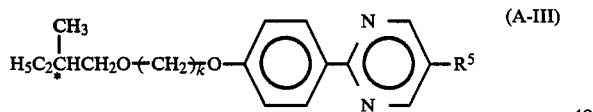
(A-III)

wherein $R^5$ represents a linear or branched chain alkyl or alkoxy group each of 1 to 18 carbon atoms; k represents an integer of 2 to 5 carbon atoms; and * indicates an asymmetric carbon atom;

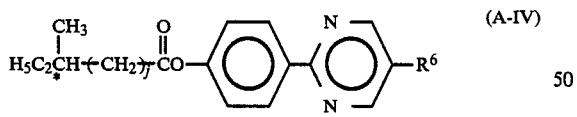
(A-IV)

wherein $R^6$ represents a linear or branched chain alkyl or alkoxy group each of 1 to 18 carbon atoms; j represents an integer of 0 to 5; and * indicates an asymmetric carbon atom;

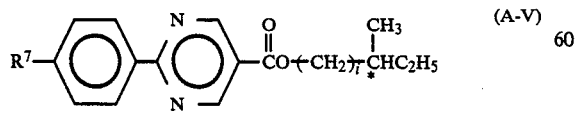
(A-V)

wherein $R^7$ represents a linear or branched chain alkyl or alkoxy group each of 1 to 18 carbon atoms; i represents an integer of 0 to 5 carbon atoms; and * indicates an asymmetric carbon atom; and

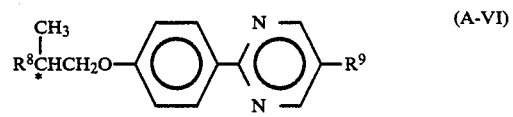
(A-VI)

wherein $R^8$ represents a linear or branched chain alkyl or alkoxy group each of 2 to 8 carbon atoms; $R^9$ represents a linear or branched chain alkyl or alkoxy group each of 1 to 18 carbon atoms; and * indicates an asymmetric carbon atom.

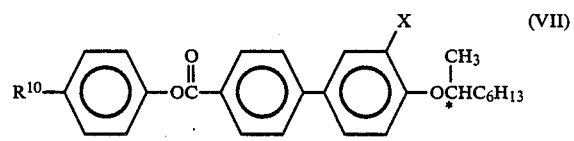
(VII)

wherein $R^{10}$ represents a linear or branched chain alkyl or alkoxy group each of 1 to 18 carbon atoms; X represents —H, —F or —CN; and * represents an asymmetric carbon atom;

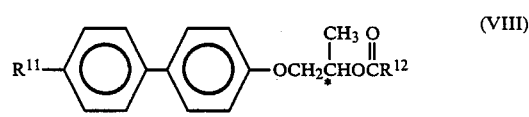
(VIII)

wherein $R^{11}$ represents a linear or branched chain alkyl or alkoxy group each of 1 to 18 carbon atoms; $R^{12}$ represents an alkyl group of 1 to 18 carbon atoms; and * indicates an asymmetric carbon atom;

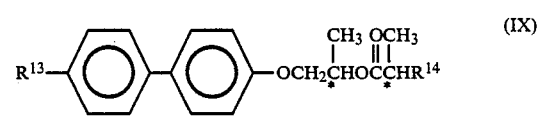
(IX)

wherein $R^{13}$ represents a linear or branched chain alkyl or alkoxy group each of 1 to 18 carbon atoms; $R^{14}$ represents a linear or branched alkyl group of 2 to 18 carbon atoms or a linear or branched alkoxy group of 1 to 18 carbon atoms; and * indicates an asymmetric carbon atom;

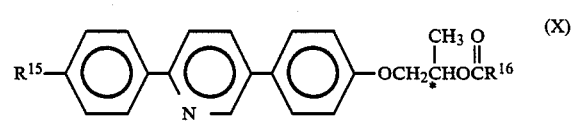
(X)

wherein $R^{15}$ represents a linear or branched chain alkyl or alkoxy group each of 1 to 18 carbon atoms; $R^{16}$ represents a linear chain alkyl group of 2 to 10 carbon atoms or a linear chain alkoxy group of 1 to 18 carbon atoms; and * represents an asymmetric carbon atom;

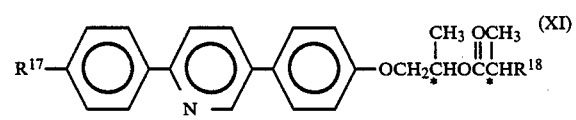
(XI)

wherein $R^{17}$ represents a linear or branched chain alkyl or alkoxy group each of 1 to 18 carbon atoms;

$R^{18}$ represents a linear chain alkyl group of 2 to 18 carbon atoms or a linear or branched alkoxy group of 1 to 10 carbon atoms; and * indicates an asymmetric carbon atom;

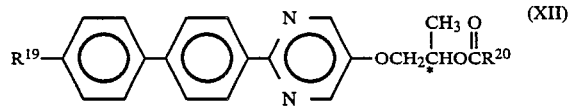
(XII)

wherein $R^{19}$ represents a linear chain alkyl or alkoxy group each of 1 to 18 carbon atoms; $R^{20}$ represents a linear chain alkyl group of 1 to 18 carbon atoms of a linear chain alkoxy group of 1 to 18 carbon atoms; and * indicates an asymmetric carbon atom;

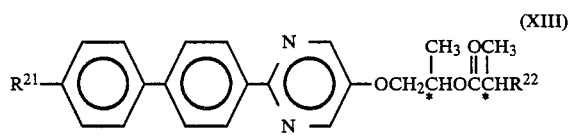
(XIII)

wherein $R^{21}$ represents a linear or branched chain alkyl or alkoxy group of 1 to 18 carbon atoms; $R^{22}$ represents a linear or branched chain alkyl group of 2 to 18 carbon atoms or a linear or branched chain alkoxy group of 1 to 18 carbon atoms; and * represents an asymmetric carbon atom;

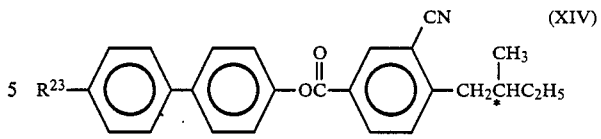
(XIV)

wherein $R^{23}$ represents a linear or branched chain alkyl or alkoxy group each of 1 to 18 carbon atoms; and * indicates an asymmetric carbon atom; and

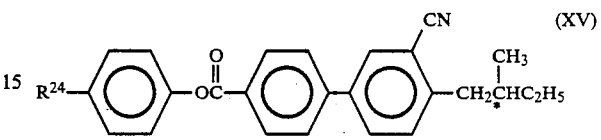
(XV)

wherein $R^{24}$ represents a linear or branched chain alkyl or alkoxy group each of 1 to 18 carbon atoms; and * indicates an asymmetric carbon atom.

2. A light switching element comprising a cell provided with transparent electrodes each subjected to parallel aligning treatment, a ferroelectric liquid crystal composition as set forth in claim 1 filled in said cell and two polarizers having the resulting cell placed therebetween and arranged in crossed nicol state.

3. A light switching element comprising a cell provided with transparent electrodes each subjected to parallel aligning treatment, a ferroelectric liquid crystal composition as set forth in claim 1 filled in said cell and one polarizer arranged outside the resulting cell so that the polarizing surface of said polarizer can be parallel to the axis of molecules in said cell.

* * * * *